United States Patent [19]

Merten et al.

[11] Patent Number: 4,679,429

[45] Date of Patent: Jul. 14, 1987

[54] HYDRAULIC RAM STROKE MONITORING APPARATUS

[75] Inventors: Gerhard Merten; Werner Rafael, both of Lunen; Horst Schlüsener, Werne, all of Fed. Rep. of Germany

[73] Assignee: Gewerkschaft Eisenhutte Westfalia, Lunen, Fed. Rep. of Germany

[21] Appl. No.: 807,404

[22] Filed: Dec. 10, 1985

[30] Foreign Application Priority Data

Jan. 29, 1985 [DE] Fed. Rep. of Germany ....... 3502806

[51] Int. Cl.[4] ...................... F15B 21/04; G01M 19/00

[52] U.S. Cl. ........................................ 73/168; 92/5 R

[58] Field of Search ................... 73/168; 92/5 R, 107, 92/108, 113, 5; 91/520, 1; 55/355

[56] References Cited

U.S. PATENT DOCUMENTS 3,296,854 1/1967 Morgan ............................ 73/168 X
3,486,311 12/1969 Allan, Jr. ............................. 55/355
3,648,568 3/1972 Wright ................................. 92/5 R
3,661,060 5/1972 Bowen ............................. 92/5 R X
3,986,437 10/1976 Lioux ............................... 91/420 X
4,045,089 8/1977 Hauschopp et al. ................. 299/43
4,171,211 10/1979 Carter .................................. 55/493
4,181,017 1/1980 Markle ................................. 73/168
4,423,664 1/1984 Buchl ............................. 91/520 X
4,557,179 12/1985 Takeuchi et al. .................. 92/99 X

FOREIGN PATENT DOCUMENTS 2113305 8/1983 United Kingdom .

*Primary Examiner*—Daniel M. Yasich
*Attorney, Agent, or Firm*—Sughrue, Mion, Zinn, Macpeak and Seas

[57] ABSTRACT

Apparatus for monitoring the working stroke of a hydraulic ram 1 includes an indicator 3 having a housing 24 containing a tubular measuring chamber 25 connected to the hydraulic ram by a hydraulic line 2. The tubular measuring chamber is transparent on at least one side for the observation of the level of hydraulic fluid contained therein. The lower end of the tubular measuring chamber is connected to the hydraulic line leading to the hydraulic ram. The upper end of the tubular measuring chamber is closed by an air-permeable but dust-impermeable member 28.

11 Claims, 2 Drawing Figures

HYDRAULIC RAM STROKE MONITORING APPARATUS

BACKGROUND TO THE INVENTION

This invention relates to apparatus for monitoring the working stroke of a hydraulic ram, and in particular to monitoring apparatus for a hydraulic ram used for adjusting the cutting horizon of a mineral winning machine such as a coal plough.

In order to adjust the cutting horizon of a mineral winning machine such as a coal plough, control means of various types are known. With these known types of contorl means, the position of the plough guide, that is to say the longwall conveyor carrying the plough guide, can be tilted by means of hydraulic control rams in such a manner that the plough dips towards, or rises away from, the floor of the longwall working. In a known installation of this type, the control rams are arranged between a goaf-side conveyor attachment and the head pieces which attach the conveyor to the advance mechanisms of hydraulic roof support units positioned on the goaf side of the conveyor. In use, the control rams tilt the plough guide in the plane at right-angles to the floor of the working, there being a direct relationship between the working strokes of the rams and the angle of tilt. Where the conveyor is a scraper-chain conveyor, control rams are usually associated only with alternate channel sections (pans) of the conveyor. During the tilting movement, the plough guide pivots with the conveyor about the pivot joints of the head pieces. (Control means of this type is described in the specification of U.S. Pat. No. 4,045,089).

Difficulties are encountered with these known arrangements in controlling the extension of the individual control rams. This is particularly the case when the rams are arranged in groups of, for example, three rams, each groups being associated with a respective control valve arranged on the goaf side of the conveyor. From the position at which the control valves are operated, it is not possible to monitor, in a reliable manner, the working stroke of the individually connected control systems. In practice, this can lead to inaccurate tilting of the conveyor, and hence poor control of the cutting horizon of the plough. In particular, the entire installation may be tilted in the same direction, when differential tilting is required for different portions thereof.

In order to obviate these difficulties, it has been proposed (see British Patent Specification No. 2 113 305) to provide a common indicator for each group of hydraulic rams. Each ram has a cylinder and a piston movable relative thereto. The monitoring apparatus comprises an indicator which is connected to each of the rams by a respective transmission element. The apparatus is such that the indicator provides an indication of the position of each of the pistons relative to its cylinder. The transmission elements are constituted by Bowden cables which are positioned within, and protected by, the hydraulic hoses which are used to supply the rams with pressurised hydraulic fluid.

A particular disadvantage that has been observed with this monitoring apparatus, apart from the relatively short service life of the Bowden cables, is the poor elasticity of the hydraulic hoses. These hoses become reduced in length when subjected to pressure, and this leads to nonuniform monitoring at the indicator.

In order to eliminate the difficulties inherent in the use of Bowden cables, it has been proposed (see the specification of U.S. patent application Ser. No. 610,641—which is assigned to the assignee of the present application) to connect the indicator of a monitoring apparatus to the associated hydraulic ram(s) by a respective hydraulic line. Each hydraulic ram includes a metering cylinder having a metering chamber connected to the associated hydraulic line. The indicator comprises a cylinder housing a piston which is displaced against the pressure of a return spring in dependence upon the outward movement of the metering cylinder. The metering chamber(s) of the metering cylinder(s) and the cylinder chamber of the indicator form a closed system, i.e. sealed from atmospheric pressure, so that the movement of the indicator piston over a scale gives a visible indication of the extent to which the associated hydraulic ram(s) is (or are) extended.

The aim of the invention is to provide an improved form of monitoring apparatus of this type.

SUMMARY OF THE INVENTION

The present invention provides apparatus for monitoring the working stroke of a hydraulic ram, the monitoring apparatus including an indicator having a housing containing a tubular measuring chamber connectible to the hydraulic ram by a hydraulic line, wherein the tubular measuring chamber is transparent on at least one side for the observation of the level of hydraulic fluid contained therein, the lower end of the tubular measuring chamber being connected to the hydraulic line leading to the hydraulic ram, the upper end of the tubular measuring chamber being closed by an airpermeable but dustimpermeable member.

Accordingly, this indicator does not need a special indicator piston, so that the problems and difficulties attributable to the indicator piston, such as piston sealing or piston jamming, are avoided. Instead, the stroke monitoring is effected by observation of the level of hydraulic fluid in the tubular measuring chamber, the fluid level being measured against a scale, and being dependent upon the degree of extension of the associated hydraulic ram. Moreover, by avoiding the use of an indicator piston (with piston seal and associated piston spring), this indicator is of simpler construction, and has an increased operational reliability. The indicator can, therefore, be small, compact and robust.

In a preferred embodiment, the tubular measuring chamber is constituted by a transparent tube which is seated in a reception bore formed in the housing. In this case, at least that part of the housing adjacent to said one side of the tubular measuring chamber is made of transparent material. Alternatively, the housing may be provided with an inspection opening extending in the longitudinal direction of the tube.

In another preferred embodiment, the tubular measuring chamber is constituted by a cylindrical bore formed in the housing, at least that part of the housing adjacent to said one side of the tubular measuring chamber being made of transparent material. In either case, the housing may be made of synthetic plastics material.

The space in the tubular measuring chamber above the fluid level must be constantly vented, that is to say this space must be in constant communication with the atmosphere. However, this space must be closed against access of dust. It is, therefore, advisable for a plug to constitute the air-permeable dust-impermeable member. Preferably, the plug is a sintered body.

Advantageously, the lower end of the tubular measuring chamber is connected to the hydraulic line by a port member. Preferably, the port member is a plug-like member which is screwed into the reception bore (or into said bore).

Preferably, the housing is held in a mounting which is provided with an attachment for pivotally connecting the indicator to a carrier. This enables the indicator to be attached to, for example, a longwall conveyor or an attachment thereof. The pivotal attachment enables the indicator to be orientated in such a manner that the measuring chamber is at least approximately vertical.

Advantageously, the housing is provided with a socket for housing a calibration bar. The calibration bar can be used to displace excess fluid out of the measuring chamber.

The invention also provides apparatus for controlling the position of a mineral mining machine movable along guide means, the apparatus comprising a plurality of hydraulic rams which are pivotally arranged between the guide means and a support structure for tilting the guide means, each hydraulic control ram having a cylinder and a piston movable relative thereto, each hydraulic ram being associated with a respective indicator, each of the indicators being connected to its hydraulic ram via a respective hydraulic line, the indicators being mounted in a housing, each indicator having a tubular measuring chamber the lower end of which is connected to the associated hydraulic line, wherein each tubular measuring chamber is transparent on at least one side for the observation of the level of hydraulic fluid contained therein, the upper end of each tubular measuring chamber being closed by a respective air-permeable but dust-impermeable member.

BRIEF DESCRIPTION OF THE DRAWINGS

Monitoring apparatus constructed in accordance with the invention will now be described, by way of example, with reference to the accompanying drawings, in which.

DESCRIPTION OF PREFERRED EMBODIMENT

Figure 1:
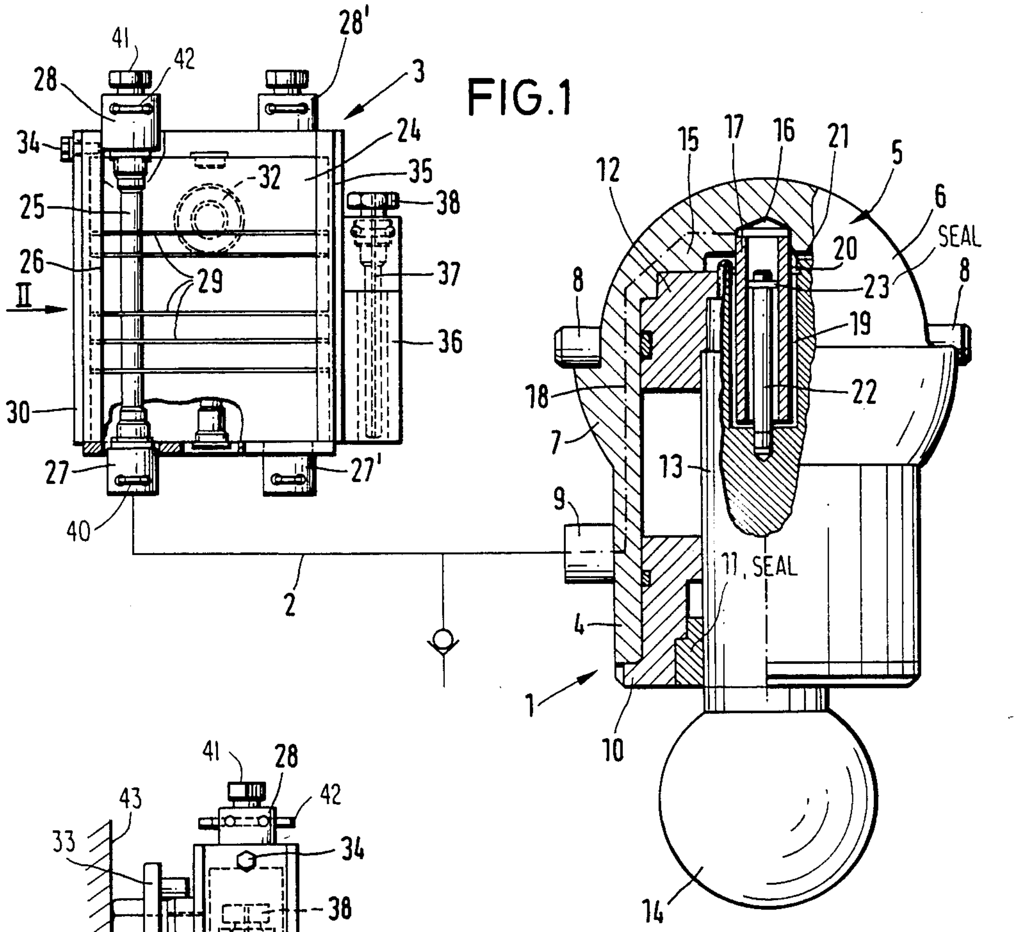
FIG. 1 is a part-sectional side elevation of the monitoring apparatus and an associated hydraulic ram.
Figure 2:
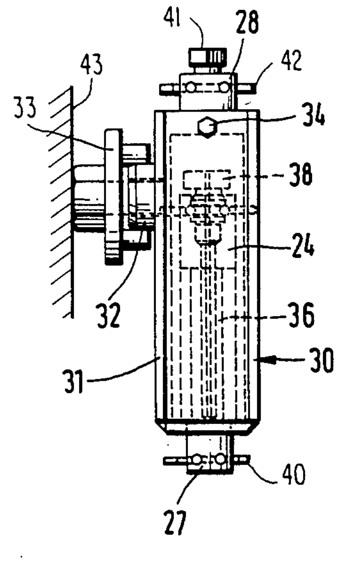
FIG. 2 shows the indicator of the apparatus of FIG. 1 looking in the direction of the arrow II shown in FIG. 1.

Referring to the drawings, FIG. 1 shows a hydraulic ram 1 which is connected, via a hydraulic line 2, to an indicator 3. The hydraulic ram 1 is a hydraulic control ram of an apparatus for controlling the cutting horizon of a mineral winning machine such as a coal plough.

The hydraulic ram 1 has a cylinder 4 having a spherical head 5 whereby it can be pivotally mounted in a joint socket (not shown) which is arranged, for example, on the goaf side of a longwall conveyor. The spherical head 5 of the cylinder 4 has a stepped radius; being constituted by a hemispherical cap 6, and a shoulder 7 disposed between the hemispherical cap and the cylinder 4. Radially-projecting lugs 8 are arranged in the zone where the cap 6 merges with the shoulder 7. The radially-projecting lugs 8 prevent rotation of the ram 1, about its axis, in its joint socket.

The cylinder 4 has a port 9, to which is connected the hydraulic line 2. The open end of the cylinder 4 is closed off by a cylindrical cover 10. A piston 12 slides in the cylinder 4, the piston having a piston rod 13 which slides in a guide bush constituted by the cylindrical cover 10. The piston rod 13 is sealed with respect to the cover by a seal 11. The piston rod 13 has a spherical head 14 which is pivotally mounted in a joint socket (not shown) which is provided for example, on the rod head of the guide linkage of the advance mechanism of an associated roof support unit.

A bore 16 is formed centrally in the top 15 of the cylinder 4. The bore 16 communicates with the port 9 (and therefore with the hydraulic line 2) by way of a duct 18 which is formed in the wall of the cylinder 4, that is to say in the spherical cap 6 and the shoulder 7. A metering cylinder 17 is fixed to the bore 16, the metering cylinder being slidable in a bore 19 formed in the piston rod 13. The metering cylinder 17 is sealed with respect to the cylindrical working chamber 21 of the ram 1 by an O-ring 20. A metering chamber is formed within the metering cylinder 17 by a metering piston 22. When the ram 1 is retracted, pressurised hydraulic fluid is displaced from the metering chamber, this fluid passing through the duct 18 and the hydraulic line 2 to the indicator 3. The metering piston 22 is secured to the piston rod 13, that is to the base of the bore 19, the metering piston being sealed off, by means of a gasket 23, with respect to the inner wall of the metering cylinder 17.

The indicator 3 has a housing 24 which contains a transparent indicator tube 25 defining a measuring chamber, the tube being seated in a vertical reception bore 26 provided in the housing. A port member 27 is provided at the lower end of the indicator tube 25, the port member being connected to the hydraulic line 2. The port member 27 is in the form of a plug, and is screwed, from beneath, into the bore 26 of the housing 24, the hydraulic line 2 being connectible to the port by means of, for example, a push-in coupling 40.

The upper end of the indicator tube 25 is closed by a closure body 28 which is air-permeable but prevents the penetration of dust into the indicator tube. Thus, the interior of the indicator tube 25 is in constant communication with the external atmosphere via the closure body 28. The closure body 28 is in the form of a plug which is screwed, from above, into the bore 26. The plug-like closure body 28 may include an internal filter insert 41 secured in place by a push-in coupling 42 and which is air-permeable but prevents the entry of dust into the tube, and such closure body 28 (or the filter insert arranged therein) preferably consists of an air-permeable sintered body.

The two ends of the transparent indicator tube 25 are held by the screwed-in plugs 27 and 28. The housing 24 is also made of a transparent material, such as a synthetic plastics material, whereby the level of the fluid in the indicator tube 25 can be ascertained from the exterior of the housing. Alternatively, the housing 24 may be opaque and be provided with an inspection window on the visible (or reading) side of the indicator. A scale 29 is formed on the housing 24, so that the degree to which the ram 1 is extended can be read. It will be understood that the level of the fluid in the indicator tube 25 is dependent upon the degree of extension of the hydraulic ram 1, and has its maximum value when the hydraulic ram is fully retracted, and its minimum value when the hydraulic ram is fully extended.

In general, the housing 24 contains three small indicator tubes 25, to which three hydraulic rams 1 of a group are connected by separate hydraulic lines 2, the indicator tubes being expediently arranged parallel to one another. Thus, with the aid of the indicator 3, the degree of extension of three hydraulic rams 1 can be indicated at any time. In FIG. 1, the components of a second indicator tube corresponding to the parts 27 and 28 are indicated by 27' and 28'. Alternatively, the indicator may contain any other number of indicator tubes 25, whereby the indicator is suitable for the indication of the degree of extension of the hydraulic rams 1 of a group of rams having any desired number.

The housing 24 is seated in a stable mounting frame 30, the housing being made fast in the mounting by means of a locking screw 34. The frame 30 has an open box-shaped construction, into which the housing 24 can be inserted or pushed. The box-shaped frame 30 is open on the inspection (reading) side of the housing 24. Alternatively, the frame 30 may have an aperture through which the indicator tubes 25 are visible. The frame 30 has a rear wall 31 which is provided with a pivot journal 32 which engages in the bore of a socket 33. The pivot journal 32 and socket 33 constitute a pivot joint for connecting the indicator 3 to a support 43 in any desired position. For example, the pivot joint can be used to connect the indicator 3 to a longwall conveyor or an attachment thereof.

On one vertical narrow side 35, the frame 30 has a socket 36 for a calibration radar bar 37 which is provided with a head piece 38. In order to calibrate the indicator 3, the calibration bar 37 is drawn upwards out of its socket 36. Then, with a given plug 28 unscrewed, the calibration bar 37 is introduced, from above, into the associated indicator guide 25. Alternatively, the calibration bar 37 may be introduced into the indicator tube 25 through the plug 28 by first removing the filter insert 41. Any excess fluid is then displaced upwards out of the indicator tube 25. When not in use, the calibration bar 37 is re-inserted into the socket 36.

Obviously, the indicator 3 described above could be modified in a number of ways. For example, it may be possible to dispense with the transparent indicator tube(s). In that case, each indicating device 25 can be formed by a bore in the housing 24, to which bore the port member or plug 27 is attached from beneath, and the plug 28 is attached from above. If the housing 24 is made of transparent synthetic plastics material, the liquid level in the bore(s) forming the indicating device(s) can be read off without difficulty. If, on the other hand, the housing 24 is made of opaque material, each bore forming an indicating device can be closed, on the reading side of the indicator 3, by a transparent inspection window.

We claim:

1. In a hydraulic arrangement comprising a hydraulic ram (1) and apparatus (3) for monitoring the working stroke of the hydraulic ram, such as for adjusting the cutting horizon of a mineral winning machine in the form of a coal plough or the like, the monitoring apparatus including an indicator having a housing (24) containing a tubular measuring chamber (25) connected to the hydraulic ram by a hydraulic line (2), the improvements comprising: the tubular measuring chamber being transparent on at least one side for the observation of the level of hydraulic fluid contained therein, means connecting the lower end of the tubular measuring chamber to the hydraulic line leading to the hydraulic ram, and an air-permeable but dust-impermeable plug (28) closing the upper end of the tubular measuring chamber, said plug thus establishing atmospheric communication with the upper interior of the measuring chamber while shielding the interior of the chamber from contaminating dust particles, and said plug being removable from the chamber to enable the insertion thereinto of a calibrating device.

2. Monitoring apparatus according to claim 1, wherein the tubular measuring chamber is a transparent tube which is seated in a reception bore (26) formed in the housing.

3. Monitoring apparatus according to claim 2, wherein at least that part of the housing adjacent to said one side of the tubular measuring chamber is made of transparent material.

4. Monitoring apparatus according to claim 1, wherein the housing is held in a frame (30) which is provided with an attachment (32, 33) for pivotally connecting the indicator to a carrier.

5. Monitoring apparatus according to claim 1, wherein the housing is made of synthetic plastics material.

6. Monitoring apparatus according to claim 1, wherein the housing is provided with a socket (36) for housing a calibration bar (37).

7. Monitoring apparatus according to claim 1, wherein the plug is a sintered body.

8. In a hydraulic arrangement comprising a hydraulic ram (1) and apparatus (3) for monitoring the working stroke of the hydraulic ram, such as for adjusting the cutting horizon of a mineral winning machine in the form of a coal plough or the like, the monitoring apparatus including an indicator having a housing (24) containing a tubular measuring chamber (25) connected to the hydraulic ram by a hydraulic line (2), the improvements comprising: the tubular measuring chamber being transparent on at least one side for the observation of the level of hydraulic fluid contained therein, means connecting the lower end of the tubular measuring chamber to the hydraulic line leading to the hydraulic ram, and an air-permeable but dust-impermeable plug (28) closing the upper end of the tubular measuring chamber, wherein the tubular measuring chamber comprises a transparent tube seated in a reception bore (26) formed in the housing, and wherein the housing is mounted in a frame (30) provided with an attachment (32, 33) for pivotally connecting the indicator to a carrier.

9. Monitoring apparatus according to claim 8, wherein the housing is provided with an inspection opening extending in the longitudinal direction of the tube.

10. Monitoring apparatus according to claim 8, wherein the lower end of the tubular measuring chamber is connected to the hydraulic line by a port member.

11. Monitoring apparatus according to claim 10, wherein the port member is a plug-like member which is screwed into the reception bore.

* * * * *